US011907910B2

(12) United States Patent
Libin (10) Patent No.: US 11,907,910 B2
(45) Date of Patent: Feb. 20, 2024

(54) CONTENT ASSOCIATIONS AND SHARING FOR SCHEDULED EVENTS

(71) Applicant: EVERNOTE CORPORATION, Redwood City, CA (US)

(72) Inventor: Phil Libin, San Jose, CA (US)

(73) Assignee: EVERNOTE CORPORATION, San Diego, CA (US)

( * ) Notice: Subject to any disclaimer, the term of this patent is extended or adjusted under 35 U.S.C. 154(b) by 981 days.

(21) Appl. No.: 16/162,055

(22) Filed: Oct. 16, 2018

(65) Prior Publication Data

US 2019/0272507 A1 Sep. 5, 2019

Related U.S. Application Data

(63) Continuation of application No. 15/683,690, filed on Aug. 22, 2017, now Pat. No. 10,102,506, which is a continuation of application No. 14/227,292, filed on Mar. 27, 2014, now Pat. No. 9,773,231.

(60) Provisional application No. 61/828,223, filed on May 29, 2013.

(51) Int. Cl.
*G06Q 10/1093* (2023.01)
(52) U.S. Cl.
CPC ................ *G06Q 10/1095* (2013.01)
(58) Field of Classification Search
None
See application file for complete search history.

(56) References Cited

U.S. PATENT DOCUMENTS 7,161,619 B1  1/2007 Niida et al.
7,454,377 B1  11/2008 Beaumont et al.
(Continued)

FOREIGN PATENT DOCUMENTS

WO   WO 2013/025460 A1   2/2013

OTHER PUBLICATIONS

Gene Golovchinsky, Scott Carter, Jacob Biehl, Beyond the Drawing Board: Toward More Effective Use of Whiteboard Content, Dec. 9, 2009, arXiv:0911.0039v2 (Year: 2009).*

(Continued)

*Primary Examiner* — Mehmet Yesildag
(74) *Attorney, Agent, or Firm* — Morgan, Lewis & Bockius LLP (57) ABSTRACT

Sharing content includes verifying occurrence of an event, determining participants of the event, gathering related content generated by the participants, where the related content corresponds to the event, and disseminating the related content to the participants. The event may be a business meeting. Verifying occurrence of an event may include determining scheduled participants, scheduled location, and scheduled time of the event using an electronic calendar of one of the scheduled participants. Participants may include the scheduled participants and other participants that are not listed in the electronic calendar where the other participants attend the event. Verifying occurrence of an event may also include confirming that at least an event organizer is at the scheduled location at the scheduled time and there is at least one other one of the participants. The content may include documents, photos, scanned images, audio clips, video clips, typed notes, and/or handwritten notes.

27 Claims, 5 Drawing Sheets

(56) References Cited

U.S. PATENT DOCUMENTS

| | | | |
|---|---|---|---|
| 7,796,309 B2* | 9/2010 | Sadovsky | G06F 16/94 358/474 |
| 8,453,044 B2 | 5/2013 | Markus et al. | |
| 9,430,131 B1 | 8/2016 | Zhang | |
| 10,545,638 B2 | 1/2020 | Ayzenshtat et al. | |
| 11,500,524 B2 | 11/2022 | Ayzenshtat et al. | |
| 2002/0135614 A1 | 9/2002 | Bennett et al. | |
| 2004/0205347 A1* | 10/2004 | Erol | G06F 16/838 713/178 |
| 2005/0273372 A1* | 12/2005 | Bowne | G06Q 10/10 705/5 |
| 2006/0009987 A1* | 1/2006 | Wang | G06F 9/50 705/7.13 |
| 2007/0016661 A1 | 1/2007 | Malik | |
| 2007/0067420 A1 | 3/2007 | Yamaguchi | |
| 2007/0070940 A1* | 3/2007 | Vander Veen | G06Q 10/107 370/328 |
| 2008/0300937 A1* | 12/2008 | Allen | G06Q 30/0201 705/7.33 |
| 2009/0013250 A1 | 1/2009 | Hsieh et al. | |
| 2009/0164416 A1 | 6/2009 | Guha | |
| 2010/0036782 A1 | 2/2010 | Zhao et al. | |
| 2010/0141393 A1* | 6/2010 | Daniel | G06Q 10/08 340/10.3 |
| 2010/0142807 A1 | 6/2010 | Yasuda et al. | |
| 2010/0306018 A1 | 12/2010 | Burtner et al. | |
| 2011/0047485 A1* | 2/2011 | Takakura | G06F 21/84 715/753 |
| 2011/0279350 A1 | 11/2011 | Hutchinson et al. | |
| 2011/0282964 A1 | 11/2011 | Krishnaswamy et al. | |
| 2011/0320958 A1* | 12/2011 | Kashi | G06Q 10/1095 715/751 |
| 2012/0221963 A1 | 8/2012 | Motoyama | |
| 2013/0036117 A1 | 2/2013 | Fisher et al. | |
| 2013/0073329 A1 | 3/2013 | Shoham et al. | |
| 2013/0086487 A1 | 4/2013 | Findlay et al. | |
| 2013/0093829 A1 | 4/2013 | Rosenblatt et al. | |
| 2013/0222257 A1 | 8/2013 | Kwon | |
| 2013/0238731 A1 | 9/2013 | Sato | |
| 2014/0108506 A1 | 4/2014 | Borzycki et al. | |
| 2014/0188541 A1 | 7/2014 | Goldsmith et al. | |
| 2014/0344745 A1* | 11/2014 | Possing | G06Q 10/109 715/772 |
| 2015/0046367 A1 | 2/2015 | Libin et al. | |
| 2021/0176081 A1* | 6/2021 | Stucker | H04L 12/1831 |
| 2023/0054747 A1 | 2/2023 | Ayzenshtat et al. | |

OTHER PUBLICATIONS

Evernote Corporation, International Search Report, PCT/US14/36874, dated Sep. 30, 2014, 8 pgs.

Evernote Corporation, International Preliminary Report on Patentability, PCT/US2014/036874, dated Dec. 1, 2015, 7 pgs.

Libin, Non-Final Office Action, U.S. Appl. No. 15/683,690, dated Sep. 7, 2017, 9 pgs.

Libin, Notice of Allowance, U.S. Appl. No. 15/683,690, dated Jun. 11, 2018, 8 pgs.

Libin, Notice of Allowance, U.S. Appl. No. 15/683,690, dated Jul. 24, 2018, 2 pgs.

Libin, Non-Final Office Action, U.S. Appl. No. 14/227,292, dated Apr. 6, 2016, 20 pgs.

Libin, Final Office Action, U.S. Appl. No. 14/227,292, dated Nov. 3, 2016, 25 pgs.

Libin, Notice of Allowance, U.S. Appl. No. 14/227,292, dated May 22, 2017, 15 pgs.

Allegrezza, Serge et al., "Internet Econometrics," Google Books, Jan. 17, 2012, http://books.google.com/books?id=w1hhF8J-jVsC&source-gbs navlinks_S., 2 pgs., Ayzenshtat, Office Action, U.S. Appl. No. 14/470,021, dated Nov. 23, 2016, 2 pgs.

Libin, Final Office Action, U.S. Appl. No. 14/312,949, dated Dec. 28, 2016, 21 pgs.

Oldenburg, Michael C., "OneNote Mobile for Android is now available worldwide," Feb. 7, 2012, http://blogs.office.com/2012/02/07/onenote-mobile-for-android-is-now-available-worldwide/, 7 pgs.

Ayzenshtat, Office Action, U.S. Appl. No. 14/470,021, dated Nov. 23, 2016, 25 pgs.

Libin, Office Action, U.S. Appl. No. 14/312,941, dated Nov. 4, 2016, 15 pgs.

Libin, Office Action, U.S. Appl. No. 14/312,949, dated Jun. 16, 2016, 18 pgs.

Evernote Corporation, International Search Report and Written Opinion, PCT/US2014/043781, dated Jan. 12, 2015, 10 pgs.

Evernote Corporation, International Preliminary Report on Patentability, PCT/US2014/043781, dated Feb. 9, 2016, 7 pgs.

Evernote Corporation, International Search Report and Written Opinion, PCT/US2014/052859, dated Dec. 19, 2014, 8 pgs.

Evernote Corporation, International Preliminary Report on Patentability, PCT/US2014/052859, dated Mar. 22, 2016, 7 pgs.

Libin, Office Action, U.S. Appl. No. 14/312,949, dated Jul. 6, 2017, 24 pgs.

Libin, Office Action, U.S. Appl. No. 14/470,021, dated Nov. 23, 2016, 25 pgs.

Libin, Final Office Action, U.S. Appl. No. 14/470,021, dated Jul. 13, 2017, 12 pgs.

Libin, Final Office Action, U.S. Appl. No. 14/312,941, dated Sep. 8, 2017, 8 pgs.

Libin, Office Action, U.S. Appl. No. 14/312,949, dated Apr. 6, 2018, 24 pgs.

Ayzenshtat, Final Office Action, U.S. Appl. No. 14/470,021, dated Mar. 26, 2019, 36 pgs.

Ayzenshtat, Non-Final Office Action, U.S. Appl. No. 14/470,021, dated Jun. 20, 2018, 38 pgs.

Ayzenshtat, Notice of Allowance, U.S. Appl. No. 14/470,021, dated Sep. 27, 2019, 14 pgs.

Saylor Academy—Math 102 Notes, Chapter 9, "Exponential Growth and Decay: Differential Equations," Salor Academy, Sep. 2009, from https://www/saylor.org/site/wp-content/uploads/2011/06/MA221-2.1.1.pdf, 15 pgs.

* cited by examiner

CONTENT ASSOCIATIONS AND SHARING FOR SCHEDULED EVENTS

CROSS-REFERENCE TO RELATED APPLICATIONS

This application is a continuation of U.S. patent application Ser. No. 15/683,690, filed Aug. 22, 2017, and entitled "CONTENT ASSOCIATIONS AND SHARING FOR SCHEDULED EVENTS," which is a continuation of U.S. patent application Ser. No. 14/227,292, filed Mar. 27, 2014, and entitled "CONTENT ASSOCIATIONS AND SHARING FOR SCHEDULED EVENTS," now U.S. Pat. No. 9,773,231, issued on Sep. 26, 2017, which claims priority to U.S. Provisional Application No. 61/828,223, filed May 29, 2013, and entitled "CONTENT ASSOCIATIONS AND SHARING FOR SCHEDULED EVENTS," all of which are incorporated herein by reference in their entirety.

TECHNICAL FIELD

This application is directed to the field of analyzing, processing and presenting information, and more particularly to the field of compiling and sharing user content associated with scheduled events.

BACKGROUND OF THE INVENTION

Business meetings are an important part of a corporate life. Numerous workflows, hardware solutions, software applications and online services have been developed to facilitate scheduling, preparations, conduct, information exchange and follow-up on business meetings, as well as distribution of accompanying business notes and documents. Nevertheless, achieving high productivity and efficiency of business meetings is still a challenging goal. On an average day, there are 17-20 million meetings in America; according to industry and academic research, people spend 20-40% (upper management is spending over 50%) of their time in meetings; however, by various estimates, meetings are only 44-50% efficient, while 25% of time in meetings is spent discussing irrelevant issues. In a recent survey of 1300 business leaders from Europe and North America, 25 to 50 percent of respondents questioned the efficiency of existing meeting systems. At the same time, 80% of survey participants identified technology advances as the number one factor for future increase in meeting productivity.

With the proliferation of multi-platform content management systems, such as the Evernote service and software offered by the Evernote Corporation of Redwood City, CA, meeting related materials may be stored in a common or business-owned cloud and synchronized across multiple devices and individuals. Such storage, synchronization and usage are possible for both the pre-meeting materials that may even serve as a basis of instant presentations directly from entries of a content collection implemented in Evernote and for the meeting notes and follow-up materials.

In particular, handwritten notes remain a useful method of capturing and delivering information during business meetings and other scheduled events. Correspondingly, paper notebooks and pads, whiteboards, flip charts and other handwriting related media remain ubiquitous business items. The industry of traditional writing instruments, such as pen and paper notebook or dry erase markers and a whiteboard has recently seen notable developments of convenient and elegant solutions for the business markets; examples include Moleskine notebooks and ubiquitous Idea Paint whiteboard products.

Additionally, hundreds of millions of professionals are using camera-enabled and location aware smartphones, which combine features including organizer where schedule and contact info are always before the user, a time and location aware device, a communicator and a connected device capable of instant sharing of information, a data capturing instrument that may take a photo of handwritten notes or record an audio, and an information access device running a client software for a content management system. Advances in image recognition made photos and scans of handwritten notes taken on paper and on traditional whiteboards a searchable data format. In addition, advanced image pre-processing, such as the document camera feature of the Evernote solution, combined with easy manipulation and search in images, increases the attractiveness of an office workflow from paper/whiteboard—to smartphone camera photo—to content management system, which is broadly employed by Evernote users.

Notwithstanding the significant progress in building advanced technologies bridging document and handwritten solutions with content management systems, on the one hand, and with meeting workflows, on the other hand, major challenges remain. There is a notable discrepancy between business planning and scheduling (calendar and task planning processes) and meeting related notes and documents stored in content management systems and elsewhere. Paper notebooks lack differentiation between business and personal notes, although professionals routinely combine private memos and doodles with business notes during meetings. Sharing photos of business notes taken on paper of whiteboards lacks integration and well-defined process flow. Identification of materials relevant for a particular meeting, and seamless automatic or semi-automatic distribution of the materials to individuals and groups with a need to know also requires significant improvements.

Accordingly, it is desirable to develop a cohesive workflow between content management systems and planning/scheduling processes employed by a business, including exchange and sharing of meeting related documents of all types and, in particular, paper and whiteboard based handwritten notes and their photos taken with smartphone cameras.

SUMMARY OF THE INVENTION

According to the system described herein, sharing content includes verifying occurrence of an event, determining participants of the event, gathering related content generated by the participants, where the related content corresponds to the event, and disseminating the related content to the participants. The event may be a business meeting. Verifying occurrence of an event may include determining scheduled participants, scheduled location, and scheduled time of the event using an electronic calendar of one of the scheduled participants. Participants may include the scheduled participants and other participants that are not listed in the electronic calendar where the other participants attend the event. Verifying occurrence of an event may also include confirming that at least an event organizer is at the scheduled location at the scheduled time and there is at least one other one of the participants. Confirming that at least a subset of the scheduled participants are at the scheduled location at the scheduled time may include using location services of location aware mobile devices of the scheduled participants and the event organizer. Confirming that at least a subset of the scheduled participants are at the scheduled location at the scheduled time may include prompting the event organizer to confirm that the event is taking place. Confirming that at least a subset of the scheduled participants are at the scheduled location at the scheduled time may include determining if any of the subset of scheduled participants is using remote conferencing tools to participate in the event. The content may include documents, photos, scanned images, audio clips, video clips, des typed notes, and/or handwritten notes. The handwritten notes may be provided on special paper having areas for the event notes and areas for personal notes where the special paper is converted to an electronic format and only handwritten notes from areas for the event notes are included in the related content. Handwritten notes from areas for personal notes may be converted into an electronic format and included in personal content of an author of the handwritten notes from areas for personal notes. Related content may be determined based on similarity of the content to the event. Material submitted by a participant during an event may be deemed related content. Material submitted before or after the event may be deemed related content in response to the material strongly correlates lexically with other related content, the material mentions action items from the event, and/or the material mentions the event and at least some of the participants. An event organizer may review material that is potentially relevant content and determines whether the material is relevant content or not. Relevant content may be linked in a cluster of materials in a content management system that includes a calendar note for the event and an index that is linked to a calendar note and links to each item of the relevant content. Disseminating the related content to the participants may include using a notification mechanism, mailing the relevant content, mailing links to the relevant content, and/or publishing the relevant content.

According further to the system described herein, computer software, provided in a non-transitory computer-readable medium, shares content. The software includes executable code that verifies occurrence of an event, executable code that determines participants of the event, executable code that gathers related content generated by the participants, where the related content corresponds to the event, and executable code that disseminates the related content to the participants. The event may be a business meeting. Verifying occurrence of an event may include determining scheduled participants, scheduled location, and scheduled time of the event using an electronic calendar of one of the scheduled participants. Participants may include the scheduled participants and other participants that are not listed in the electronic calendar where the other participants attend the event. Verifying occurrence of an event may also include confirming that at least an event organizer is at the scheduled location at the scheduled time and there is at least one other one of the participants. Confirming that at least a subset of the scheduled participants are at the scheduled location at the scheduled time may include using location services of location aware mobile devices of the scheduled participants and the event organizer. Confirming that at least a subset of the scheduled participants are at the scheduled location at the scheduled time may include prompting the event organizer to confirm that the event is taking place. Confirming that at least a subset of the scheduled participants are at the scheduled location at the scheduled time may include determining if any of the subset of scheduled participants is using remote conferencing tools to participate in the event. The content may include documents, photos, scanned images, audio clips, video clips, typed notes, and/or handwritten notes. The handwritten notes may be provided on special paper having areas for the event notes and areas for personal notes where the special paper is converted to an electronic format and only handwritten notes from areas for the event notes are included in the related content. Handwritten notes from areas for personal notes may be converted into an electronic format and included in personal content of an author of the handwritten notes from areas for personal notes. Related content may be determined based on similarity of the content to the event. Material submitted by a participant during an event may be deemed related content. Material submitted before or after the event may be deemed related content in response to the material strongly correlates lexically with other related content, the material mentions action items from the event, and/or the material mentions the event and at least some of the participants. An event organizer may review material that is potentially relevant content and determines whether the material is relevant content or not. Relevant content may be linked in a cluster of materials in a content management system that includes a calendar note for the event and an index that is linked to a calendar note and links to each item of the relevant content. Disseminating the related content to the participants may include using a notification mechanism, mailing the relevant content, mailing links to the relevant content, and/or publishing the relevant content.

The proposed system verifies occurrences of scheduled events, including business meetings, automatically associates available and new materials with such events, builds a corresponding cluster of items (notes) in a content collection and shares content related to an event with an appropriate audience; the system also includes an enhanced layout of paper notebooks and a mechanism for extracting and posting handwritten notes with relevant meeting information.

In an embodiment, the first step may include a verification of a scheduled business meeting. During the meeting time, the system may track each scheduled meeting on a smartphone of a meeting organizer and on smartphones of scheduled participants. Thus, the system may check whether the meeting organizer is located at the scheduled meeting place and at least one more participant is either located at the scheduled meeting place or connected via remote conferencing tool from another location, in which case the meeting occurrence may be confirmed for all participants located at that meeting place. Any other invited participant or another individual connected, at the same time, via conferencing tools (e.g., phone, instant messaging, video conferencing, etc.) with some equipment at the main meeting place or with any of the confirmed participants may be also regarded as a meeting participant. Such a multi-tier verification process may cause sub-dividing of invited and factually participating individuals into several groups, for example:

(invited 1 uninvited)+(participating I not participating)+(physically I virtually)

Thus, genuine meeting participants may belong to a group "invited participating physically", that is, people originally included on the list of participants and present at the meeting place during the meeting. A group of "uninvited participating virtually" individuals may include employees at a remote office or a partner organization pulled into the meeting. Content sharing preferences and options may be different for different groups.

A mechanism for associating items filed into a business wide content collection, such as documents, photos, scanned images, audio and video clips, typed and handwritten notes, etc. with business meetings may be based on similarity or distance metrics measured between an available or a newly posted content item, on the one hand, and a calendar item and actual meeting attributes for a scheduled and verified meeting, on the other hand. Parameters for determining such similarity may include time, location, people, and context. For example, any materials submitted by meeting participants to a shared content collection during the meeting time may be automatically associated with the meeting; any materials that mention the meeting at a scheduled time of the meeting and some of the meeting participants may also be associated with the meeting.

For materials submitted to a shared or a business wide content collection outside of a meeting timeframe, contextual similarity may play a more significant role. For example, if a content of submitted materials strongly correlates with content filed during the meeting; or if titles of newly submitted materials are directly mentioned in an action or a to-do list from the meeting; or the materials include direct references to the meeting (e.g. meeting title and/or time & location), then additional materials may be loosely associated with the meeting. To avoid overloading of a cluster of materials related to a business meeting, such associations may be presented to the meeting organizer for approval or discarding of the association.

If a content management system used for storing the materials allows links between items of the content management system, a cluster of materials related to a meeting may be organized as a unidirectional or a bidirectional list. The cluster may include a calendar (scheduling) note for an event at a top and an index (table of contents) note bi-directionally linked to that top note. Each new item (note) added to the cluster via content associations explained elsewhere herein and adds a new entry into the table of content of the index note; the entry is linked with a newly added note, and, in case of a bidirectional list, the newly added note may also be modified by acquiring a link back to the index note. Such interlinked organization of clusters facilitates browsing of related materials by users.

Simultaneously with building sets of related materials, the system may work to ensure that all invited participants (or any viable combination of groups of participating individuals explained elsewhere herein) receive the materials stored in content collections and associated with the meeting. This may be done in different ways, including notification mechanisms, direct mailing of materials or links to locations of the materials in content collections. In cases where business wide access to the materials is authorized, the cluster of related materials may be published in a business wide content collection and notifications may be sent company or organization wide, publicized on internal company blogs, etc.

For a business oriented paper notebook used for taking meeting notes (such as an Evernote Smart Notebook by Moleskine), a special page layout may be designed, which may include two areas: a central area for business notes and margins (or narrow areas) for personal notes taken during meetings. The business note portion may be designated for sharing with co-workers and other relevant individuals, while personal notes, by default, may not be shared with anyone without an explicit instruction from the paper notebook owner.

When a meeting participant and a paper notebook owner takes a photo of one or several pages from a business oriented paper notebook with the special layout and posts the photo(s) to a content management system immediately after the meeting, the software may identify the page layout on the photo and may extract the two components of handwritten notes, namely, the business notes and the private notes. Subsequently, the system may file the different types of notes separately; for example, business notes may be filed directly into the cluster of notes relevant to the meeting stored within a shared or a business wide content collection; simultaneously, both the business and the private notes (or just the private notes) may be filed into a personal content collection of the paper notebook owner.

Photos of whiteboard or flip chart handwritten notes may be associated with the meeting according to general similarity terms. Time, author, search for the meeting title, date, participant names and other relevant content within a recognized image may serve as an analog of locating such content directly in the text of conventional documents, as explained elsewhere herein.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism for an automatic or a semi-automatic creation of a set of relevant materials associated with a business meeting or other scheduled event. The system provides meeting verification, association of materials posted into shared content collections with the meeting, extraction of relevant notes from specially designed business paper notebooks, interlinked organization of related materials in business-wide content collection, and distribution of meeting materials to appropriate individuals and groups.

Figure 1:
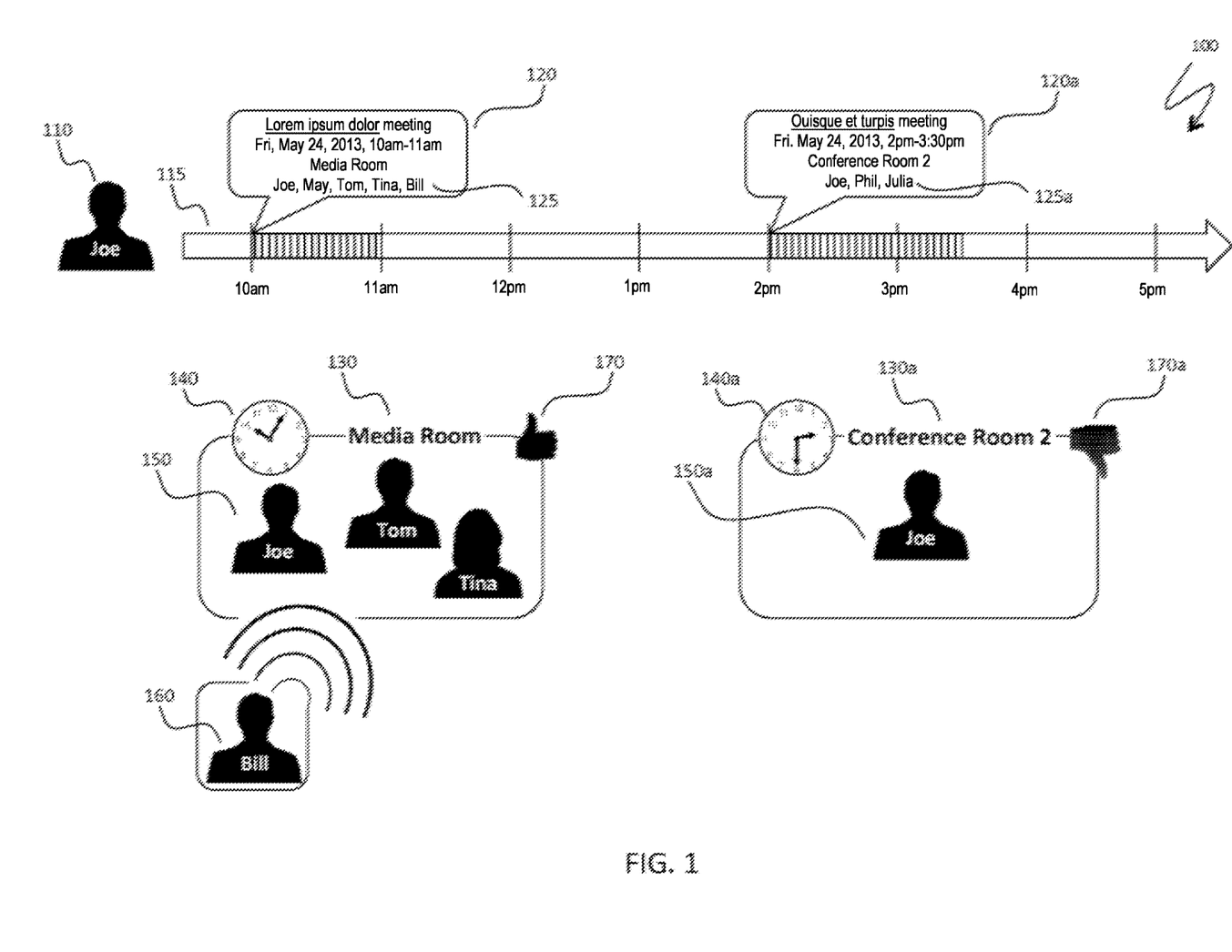
FIG. 1 is a schematic illustration of a meeting verification process, according to embodiments of the system described herein.

FIG. 1 is a schematic illustration 100 of a meeting verification process. A meeting organizer 110 has scheduled meetings arranged on a timeline 115, which may be visualized in different ways in personal and shared software calendar applications. For illustration purposes, a meeting 120 scheduled for 10 am-11 am and a meeting 120a between 2 pm and 3:30 pm are depicted on the timeline 115. Each of the meetings 120, 120a includes a list of participants; in this example, the only attendant at both meetings is the meeting organizer 110. A scheduled meeting location 130 for the meeting 120 is a Media Room. Immediately after the start of the meeting 120, the system checks locations of meeting participants using mobile devices of the participants, wearable computers and other means, etc., provided such checking is possible and permitted. The system compares current user location(s) with the location of the meeting place and makes a meeting validation determination based on user and meeting location data and on additional information about remote participants connected to the meeting room and/or other meeting participants. In FIG. 1, shortly after the start of the meeting, as indicated by a clock 140, the system finds three meeting participants 150 in the meeting room 130. Additionally, the system has detected that another original participant 160 of the meeting 120 has been connected to the meeting room 130 (or/and with a mobile device of one of meeting participants 150). The combination of physical and remote meeting participants present at the meeting location or connected with the meeting location is sufficient evidence for the system to validate (confirm the occurrence) the meeting, as indicated by an acceptance flag 170. Upon a successful validation of a meeting, the system starts compiling a cluster of relevant materials in a shared or companywide content collection, as explained elsewhere herein.

The meeting 120a with three originally scheduled participants 125a is scheduled to occur in a location 130a, Conference Room 2. In this case, long after the start of the meeting, as shown by a clock 140a, the system may identify only the presence of a meeting organizer 150a at the meeting location. This may lead to two possibilities: either the meeting has not gone as planned or other participants may be present in the conference room but mobile equipment of the other participants does not allow identifying precise location (or may be left by the participants outside of the meeting location). Since the system may be continuously tracking the location of other meeting participants close to a time of the start of the meeting, the system may be able to determine whether a location of other participants have been identifiable. If so, then the system has a reason to drop the meeting 120a, as shown by a dismissal flag 170a. If the location of the other participants is not identifiable, the system may determine a potential uncertainty and send a message to a mobile device of the meeting organizer 150a asking to confirm the status of the meeting as dismissed (possibly, postponed) or occurring with some of its participants disconnected from the system. In the latter case, the system may still validate the meeting 120a and start collecting relevant data.

Figure 2:
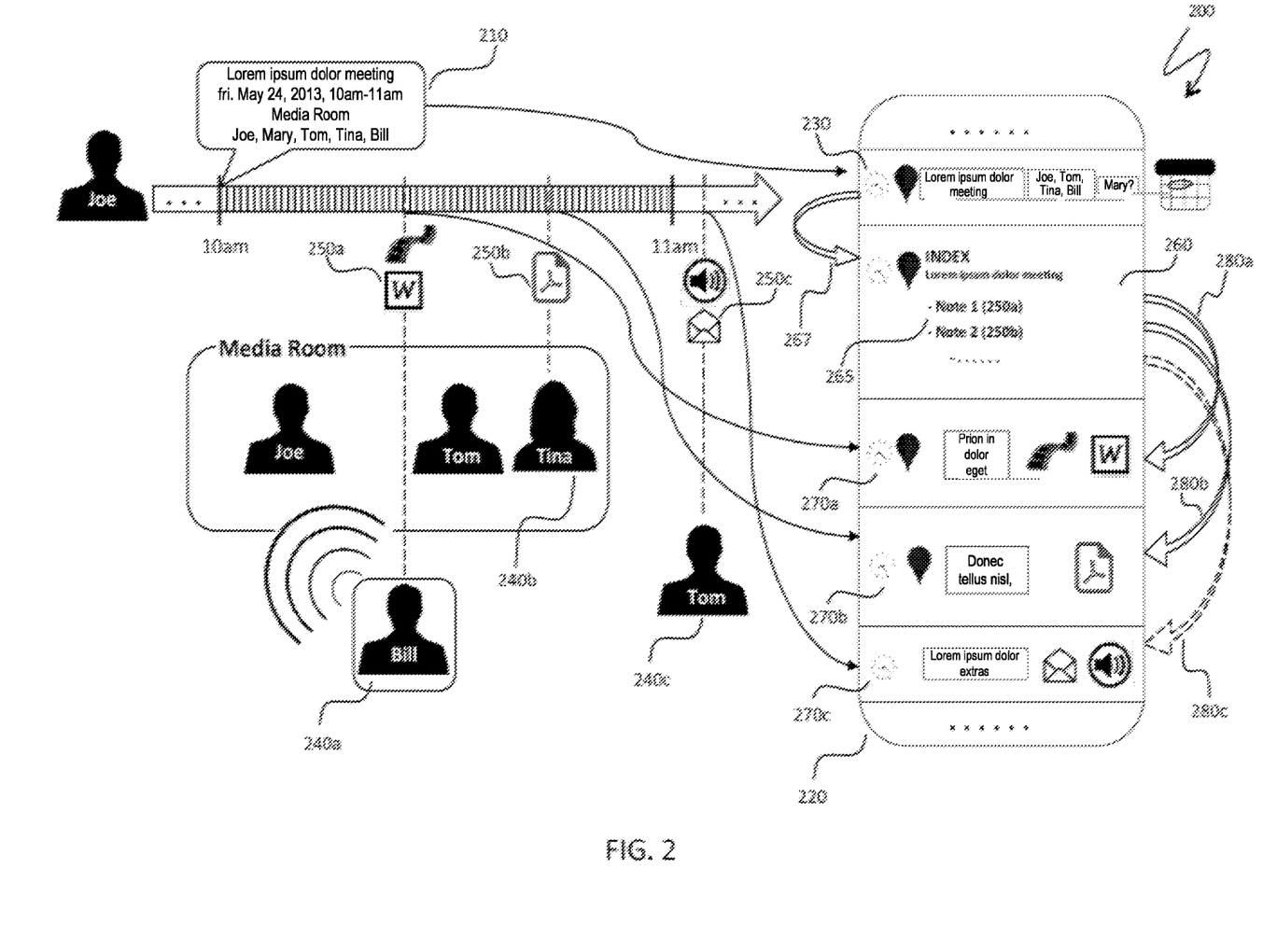
FIG. 2 schematically illustrates content associations and building of clusters of related notes for a business meeting, according to embodiments of the system described herein.

FIG. 2 is a schematic illustration 200 of content associations and building clusters of related notes for a business meeting. A business meeting 210, similar to the meeting 120 in FIG. 1, includes characteristics such as timing, agenda, location, original participants and actual participation. Materials relevant to the meeting 210 are posted into a shared content collection 220; the materials may be accessible by all or some meeting participants, by additional groups of people or by the whole company, as explained in more detail elsewhere herein.

Once the meeting 210 has been confirmed, as explained elsewhere herein, the system may create a starting calendar note 230 in the content collection 220, as indicated by a calendar icon to the right of the note 230. The note 230 may include meeting time, place, agenda, actual and missing participants and other attributes, as symbolically illustrated by icons and text boxes in the body of the note 230.

Meeting participants may post various materials related to the meeting 210, along with meeting notes, to the content collection(s). Thus, a remote participant 240a posts a batch of materials 250a during the meeting 210, including a document and a video clip. Similarly, a physical participant 240b of the meeting 210 posts a PDF document 250b, also during the meeting. Following completion of the meeting 210, a physical participant 240c of the meeting 210 posts additional materials, deemed "extras" 250c, including a summary email and an audio recording of all or a portion of the meeting 210. Each of the posts is checked by the system for relevance to the meeting 210 using similarity metrics based on time, space, people and context of the posts. For example, materials posted during the business meeting 210 by meeting participants, such as materials 250a, 250b, may be strongly associated with the meeting and the relevance check of the context of the materials 250a, 250b may be less demanding than in case of the materials 250c, which, although the materials 250c were posted by a physical participant 240c of the meeting 210, have arrived after the end of the meeting and could in principle reflect a different project of the participant. In FIG. 2, an assumption is made that all three batches of the materials 250a, 250b, 250c have proven relevant to the meeting 210.

Immediately after the arrival of the related materials 250a, the system may compile a cluster of materials associated with the meeting. The system may start with creation of an index note 260 that provides a dynamically created index 265, analogous to a table of contents (TOC). The index note 260 may include a preamble that indicates an actual time, location and title of the meeting 210. Each new entry in the index 265 corresponds to a latest arriving batch of meeting materials from each participant. After adding each entry, the system may create a new note for storing actual materials and link a TOC entry to the new note. This process is illustrated by subsequent entries of the index 265 within the index note 260, by new notes 270a, 270b, 270c corresponding to the posted materials 250a, 250b, 250c, and by links 280a, 280b, 280c allowing a viewer of the index note to access materials by clicking on TOC entries. Reciprocal links from notes with meeting materials that link back to the index note may also be present to facilitate fast scanning of meeting materials in a bi-directional cluster; reciprocal links are not shown in FIG. 2.

Figure 3:
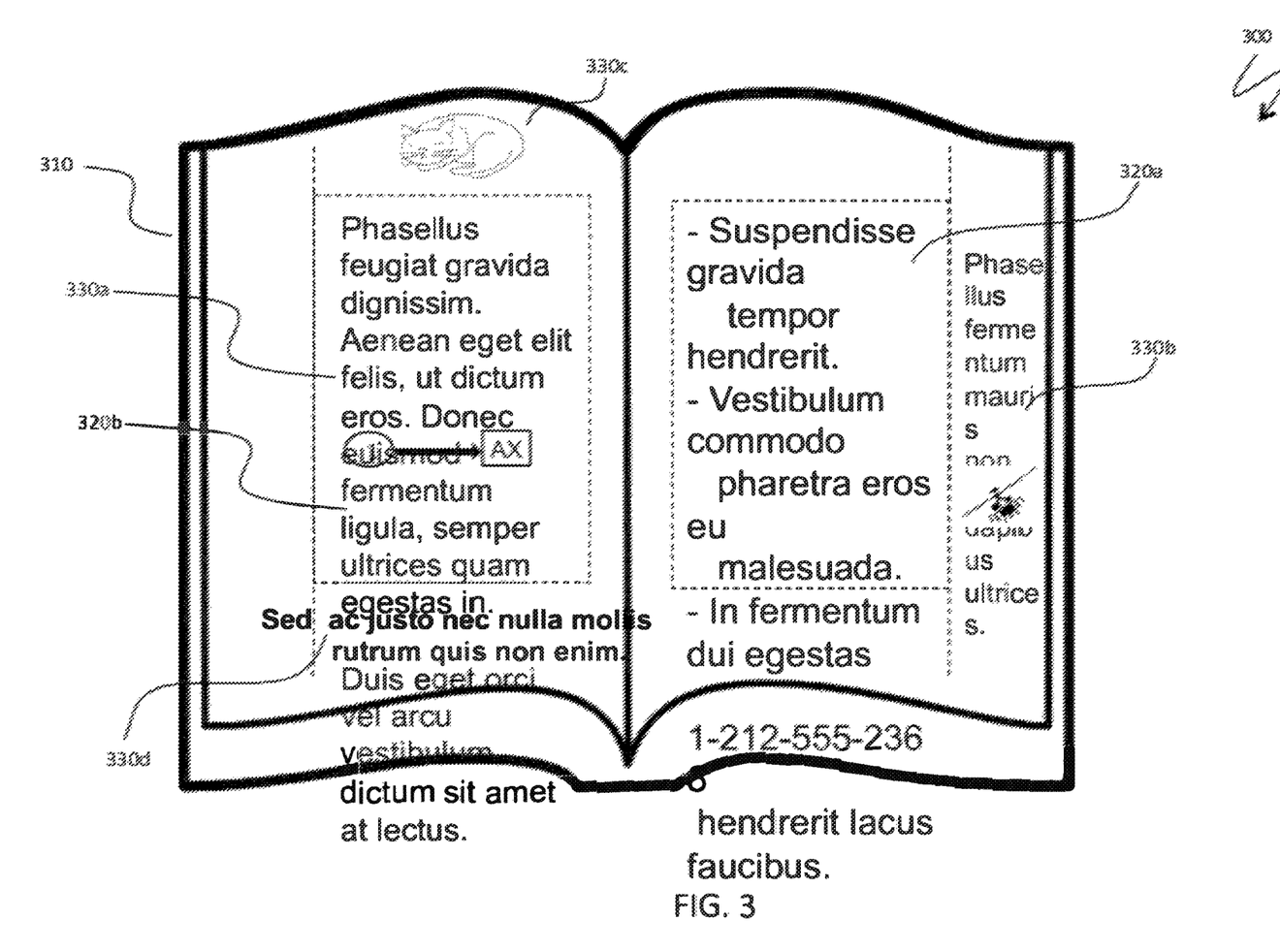
FIG. 3 is a schematic illustration of an enhanced page layout and content of a paper business notebook, according to embodiments of the system described herein.

FIG. 3 is a schematic illustration 300 of an enhanced page layout and content of a paper business notebook. Pages of a paper notebook 310 may be split into several zones, such as a central area 320a, 330a designated for business notes, together with top, bottom and side margins 330a, 330b, 330c, 330d allocated for personal notes. A meeting participant may be taking both business and personal notes in appropriate zones of the paper notebook 310. When the participant takes a photo or creates a scanned image of a page during or after the meeting using special software, such as Evernote Page Camera software, the software may recognize separating lines between zones and geometric locations of handwritten content and may separate business content from personal content prior to filing the content to a content collection, as explained elsewhere herein.

Figure 4:
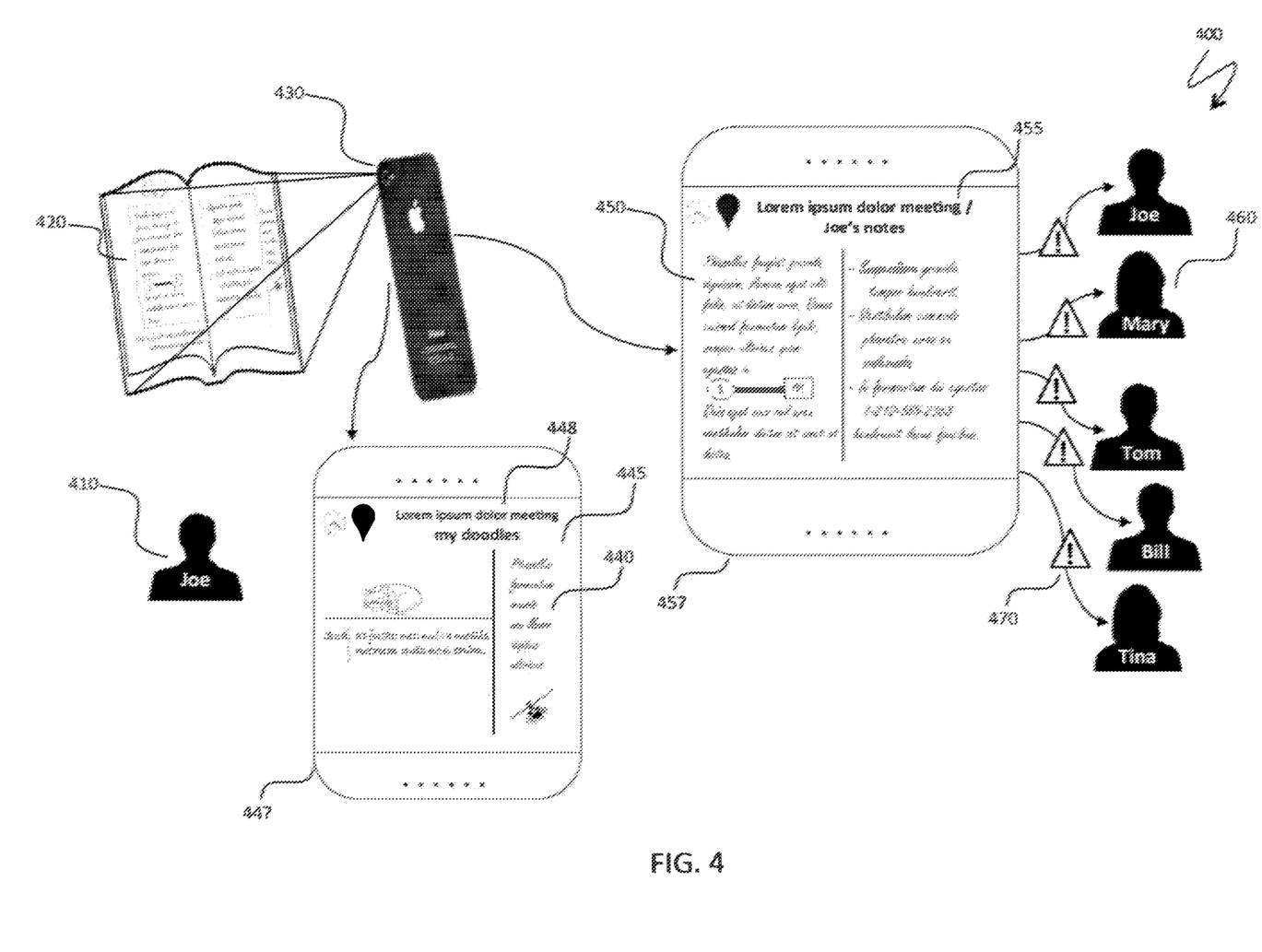
FIG. 4 is a schematic illustration of content workflow for a paper business notebook, according to embodiments of the system described herein.

FIG. 4 is a schematic illustration 400 of a content workflow for a paper business notebook. A meeting participant 410 may take business and personal notes during a meeting using a paper business notebook 420. Then, the participant 410 may take photos of handwritten pages related to the meeting using a smartphone camera 430 or another camera, or may create page images by scanning pages of the notebook 420. Handwritten content may be split by the system into multiple notes (e.g., two) that may be filed to different content collections. Specifically, personal content 440 may be posted into a personal note 445 of a participant's personal content collection 447; the note 445 may remain the sole possession of the participant. Under the assumption that a business portion of the posted handwritten content has been associated with a business meeting, as explained elsewhere herein, a title or an additional text in the personal note 445 may include a meeting title, as illustrated by an item 448. Additionally, all personal notes from photos may be merged into one note, as illustrated by the layout of the note 445; alternatively, personal handwritten notes taken on all or some margins may be posted as separate notes (not shown in FIG. 4).

Business portion(s) of handwritten content may be processed differently. Once an association of content with a business meeting is established, as explained elsewhere herein, handwritten content in an image format may be entered into one or more handwritten notes 450 of a shared or company-wide content collection 457. Note that verifying an association may include partial recognition of handwriting and search in the handwritten content for characteristic terms correlated with a meeting agenda to build an estimate of contextual similarity. A note title 455 for the handwritten note 450 may be borrowed from the meeting title and may also identify an author 410 of the note 450. The note 450 may be interlinked with an index note in a cluster of meeting related materials, as explained elsewhere herein, and an additional entry to an index note may be added (see explanations to FIG. 2). After the note 450 has been entered, invited and actual meeting participants and other individuals and groups with a need to know and forming a panel 460 may be notified about the addition via automatically generated notifications 470. Notification may include an access link to the note 450. Note that the same notification mechanism may be applied to any related materials, although the notification mechanism is not shown in FIG. 2 where the related materials are explained.

Figure 5:
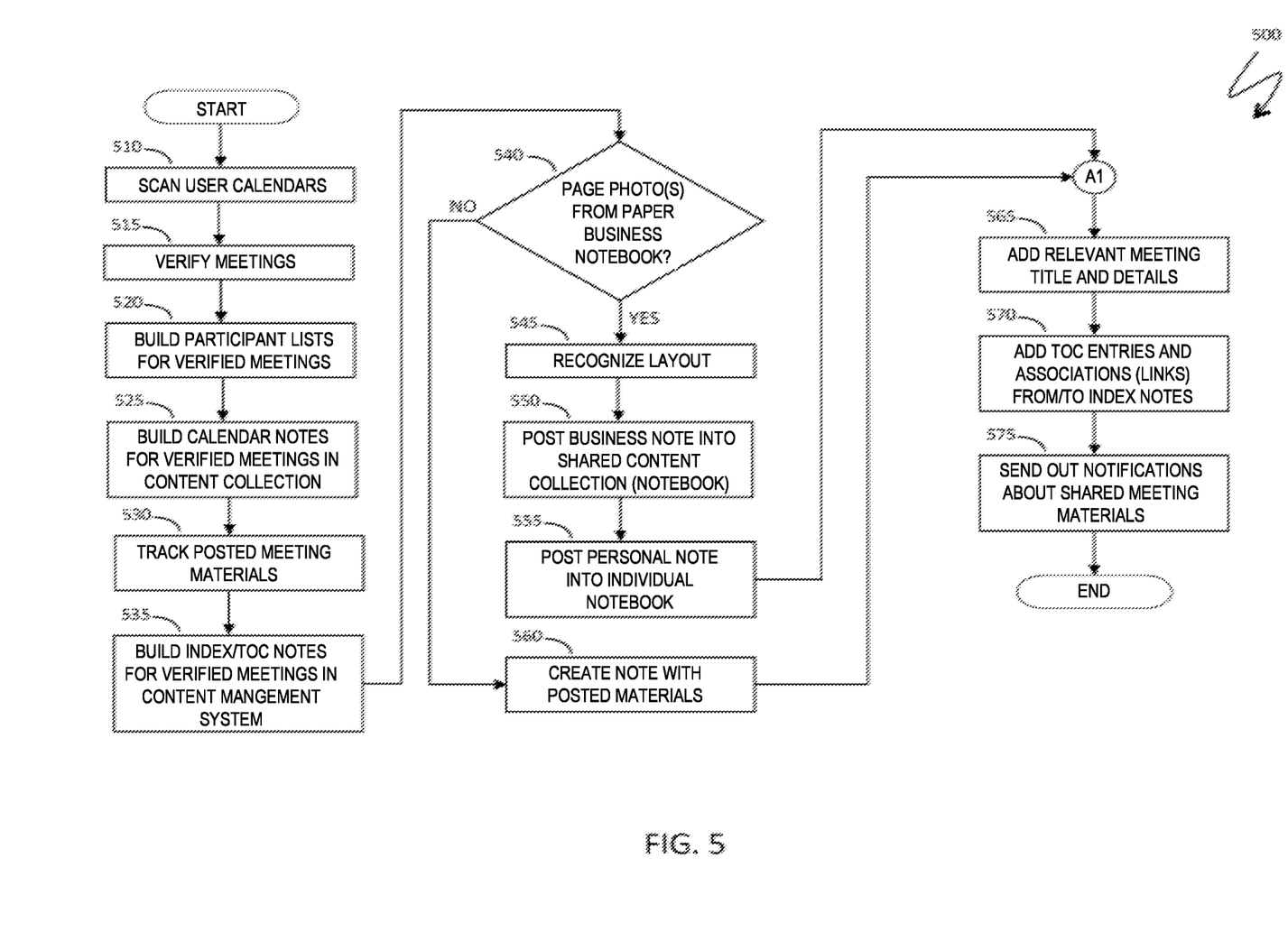
FIG. 5 is a system flow diagram illustrating processing performed in connection with managing meeting participants and content, according to embodiments of the system described herein.

Referring to FIG. 5, a flow diagram 500 illustrates functioning of the system described herein. Processing starts at a step 510 where the system scans user calendars to identify meetings. After the step 510, processing proceeds to a step 515, where meetings are verified, as explained elsewhere herein, in particular, in conjunction with FIG. 1. After the step 515, processing proceeds to a step 520, where the actual participant lists for verified meetings are compiled (see accompanying text for FIG. 1). After the step 520, processing proceeds to a step 525, where a calendar note is built for each successfully verified meeting (see FIG. 2 and the accompanying text). After the step 525, processing proceeds to a step 530, where the system tracks posted meeting materials for which association with the meeting is established. After the step 530, processing proceeds to a step 535, where an index note is built for each meeting in response to associated meeting materials being initially posted to a content collection (see FIG. 2 and the explanatory text).

After the step 535, processing proceeds to a test step 540, where it is determined whether a currently posted batch of meeting materials is a page photo (or a set of page photos) from a paper business notebook. If so, processing proceeds to a step 545, where a layout of a page photo is recognized and personal notes are separated from business notes, as explained in conjunction with FIGS. 3 and 4. After the step 545, processing proceeds to a step 550, where handwritten business content (such as notes in the central page area explained in FIG. 2) is posted into a shared content collection (such as an Evernote notebook) for subsequent access by meeting participants and possibly by others. After the step 550, processing proceeds to a step 555, where the handwritten personal content (such as notes on margins of a paper notebook) is posted into a personal content collection (notebook) for subsequent access by the author.

If it is determined at the test step 540 that the currently posted batch of meeting materials is not a page photo (or a set of page photos) from a paper business notebook, control transfers from the step 540 to a step 560, where a note (different from a business note created from a paper business notebook) with posted materials is created; examples of such notes are illustrated by items 270*a*, 270*b*, 270*c* in FIG. 2. After the step 560, processing proceeds to a step 565, which may be independently reached from the step 555. At the step 565, a meeting title and details are added to a newly created note with posted materials. After the step 565, processing proceeds to a step 570, where a new TOC entry is added to an index note, corresponding to the just added note with new meeting materials. In addition to adding a new TOC entry, the index note may be immediately linked to the new note with meeting materials. In bi-directional clusters of associated meeting notes, links may also be added in an opposite direction, that is, links from the new note to the index note (or even more specifically, from the new note to the new entry in the index note). After the step 570, processing proceeds to a step 575, where the system sends out notifications about meeting materials to participants and other individuals and groups with a need to know. After the step 575, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screen described in screen layouts may vary from the illustrations presented herein. Further, various aspects of the system described herein may be implemented using software, hardware, a combination of software and hardware and/or other computer-implemented modules or devices having the described features and performing the described functions. The mobile device may be a cell phone, although other devices are also possible. The system described herein may be implemented with any type of electronic screen capable of being actuated by a touch screen, electromagnetic or other pen.

Note that the mobile device(s) may include software that is pre-loaded with the device, installed from an app store, installed from a desktop (after possibly being pre-loaded thereon), installed from media such as a CD, DVD, etc., and/or downloaded from a Web site. The mobile device may use an operating system such as iOS, Android OS, Windows Phone OS, Blackberry OS and mobile versions of Linux OS.

Software implementations of the system described herein may include executable code that is stored in a computer readable medium and executed by one or more processors, including one or more processors of a desktop computer. The desktop computer may receive input from a capturing device that may be connected to, part of, or otherwise in communication with the desktop computer. The desktop computer may include software that is pre-loaded with the device, installed from an app store, installed from media such as a CD, DVD, etc., and/or downloaded from a Web site. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

I claim:

1. A method comprising:
at a computer system including one or more processors and memory storing programs for execution by the one or more processors:
while executing an online calendar application:
creating a starting calendar note represented by a calendar icon displayed on a first area of a user interface of the online calendar application, the starting calendar note including event information of an event
identifying one or more first remote devices associated with participants of the event based on the event information;
receiving, during or after the event and from the one or more first remote devices used by the participants of the event, a plurality of first content items that are associated with the event and provided by the participants of the event, each first content item including one of: a document, a photo, a scanned image, an audio clip, a video clip, a typed note, and a handwritten note, the plurality of first content items having two or more electronic formats distinct from the online calendar application; and
in response to receiving each of the plurality of first content items from a respective remote device, dynamically:
determining a first set of one or more content attributes associated with the first content item;
determining a set of one or more event attributes for the event; and
determining a first distance metric indicating a distance between the first set of one or more content attributes associated with the first content item and the set of one or more event attributes for the event; and
in accordance with a determination that a determined distance metric meets criteria for linking the first content item and the event:
compiling a cluster of event materials for the event, including adding the first content item to the cluster of event materials;
recognizing business content in a first portion of the first content item and personal content in a second portion of the first content item;
enabling display of a calendar index note associated with the event in a second area of the user interface of the online calendar application;
adding, in the calendar index note associated with the event, at least a first link to the first content item including the business content and the personal content
in response to receiving, from the respective remote device, a selection of the first link in the calendar index note displayed on the second area of the user interface, providing access to the first content item including the personal content in the cluster of event materials to the respective remote device; and
in response to receiving, from a distinct remote device, a user selection of the first link in the calendar index note displayed on the second area of the user interface, providing access to the business content of the corresponding first content item, thereby facilitating sharing among users of the online calendar application the cluster of event materials including the plurality of first content items that are associated with the event by the participants of the event.

2. The method of claim 1, for each first content item:
generating a content note for storage in a shared content collection; and
in response to receiving the first content items, storing at least a subset of the first content items in the content note in the shared content collection, wherein the first link is a link in the calendar index note for accessing the content note, and the content note includes a second link for accessing the calendar index note.

3. The method of claim 2, including adding the content note to the shared content collection accessible by the participants of the event and providing access to the content note to the participants of the event.

4. The method of claim 2, wherein for each first content item, the calendar index note includes an indication of at least one attribute of the set of one or more event attributes.

5. The method of claim 1, including, at a time that corresponds to the event:
obtaining location information for one or more participants of the event from a subset of respective first remote devices of the one or more participants;
comparing the location information for the one or more participants with a location of the event; and
in response to determining that the location information for the one or more participants satisfies event validation criteria, creating the calendar index note.

6. The method of claim 1, including:
receiving, from a second remote device, a second content item, the second content item including at least one content item of one or more documents, photos, scanned images, audio clips, video clips, typed notes, and/or handwritten notes;
in response to receiving the second content item;
determining a second set of one or more content attributes associated with the second content item;
determining a second distance metric indicating a distance between the second set of one or more content attributes associated with the second content item and the set of one or more event attributes for the event; and
in accordance with a determination that the determined second distance metric meets criteria for linking the second content item and the event, storing, in the calendar index note associated with the event, a third link to the second content item; and
in response to user selection of the third link in the calendar index note, providing access to the second content item, thereby facilitating sharing among the users of the online calendar application the cluster of event materials including the second content item.

7. The method of claim 1, wherein the set of one or more event attributes includes at least one of: event time information, event location information, event agenda information, one or more attending participants, one or more action items associated with the event, and one or more absent event participants.

8. The method of claim 7, wherein the first set of one or more content attributes includes at least one of: a time at which the first content item was posted, a location that corresponds to the first content item, a context that corresponds to the first content item, information about an action item in the content item, and information corresponding to a user that posted the first content item.

9. The method of claim 1, wherein:
the plurality of first content items include at least one digital image of handwritten notes provided on one or more pages, wherein at least one page of the one or more pages includes a first area designated for business notes and a second area designated for personal notes.

10. The method of claim 1, further comprising, in response to receiving each first content item from the respective remote device, implementing at least one of:
storing the business content of the first content item in a shared digital content collection; and
storing the personal content of the first content item in a personal content collection.

11. A computing device, comprising:
one or more processors;
memory; and
one or more programs stored in the memory configured for execution by the one or more processors, the one or more programs including instructions for:
while executing an online calendar application:
creating a starting calendar note represented by a calendar icon displayed on a first area of a user interface of the online calendar application, the starting calendar note including event information of an event
identifying one or more first remote devices associated with participants of the event based on the event information;
receiving, during or after the event and from the one or more first remote devices used by the participants of the event, a plurality of first content items that are associated with the event and provided by the participants of the event, each first content item including one of: a document, a photo, a scanned image, an audio clip, a video clip, a typed note, and a handwritten note, the plurality of first content items having two or more electronic formats distinct from the online calendar application; and
in response to receiving each of the plurality of first content items from a respective remote device, dynamically:
determining a first set of one or more content attributes associated with the first content item;
determining a set of one or more event attributes for the event; and
determining a first distance metric indicating a distance between the first set of one or more content attributes associated with the first content item and the set of one or more event attributes for the event; and
in accordance with a determination that a determined distance metric meets criteria for linking the first content item and the event:
compiling a cluster of event materials for the event, including adding the first content item to the cluster of event materials;
recognizing business content in a first portion of the first content item and personal content in a second portion of the first content item;
enabling display of a calendar index note associated with the event in a second area of the user interface of the online calendar application;

adding, in the calendar index note associated with the event, at least a first link to the first content item including the business content and the personal content
in response to receiving, from the respective remote device, a selection of the first link in the calendar index note displayed on the second area of the user interface, providing access to the first content item including the personal content in the cluster of event materials to the respective remote device; and
in response to receiving, from a distinct remote device, a user selection of the first link in the calendar index note displayed on the second area of the user interface, providing access to the business content of the corresponding first content item, thereby facilitating sharing among users of the online calendar application the cluster of event materials including the plurality of first content items that are associated with the event by the participants of the event.

12. The computing device of claim 11, wherein the one or more programs include instructions for:
for each first content item:
generating a content note for storage in a shared content collection; and
in response to receiving the first content items, storing at least a subset of the first content items in the content note in the shared content collection, wherein the first link is a link in the calendar index note for accessing the content note, and the content note includes a second link for accessing the calendar index note.

13. The computing device of claim 12, wherein the one or more programs include instructions for adding the content note to the shared content collection accessible by the participants of the event, and providing access to the content note to the participants of the event.

14. The computing device of claim 12, wherein the calendar index note includes an indication of at least one of the event attributes.

15. The computing device of claim 11, wherein the one or more programs include instructions for, at a time that corresponds to the event:
obtaining location information for one or more participants of the event from a subset of respective first remote devices of the one or more participants;
comparing the location information for the one or more participants with a location of the event; and
in response to determining that the location information for the one or more participants satisfies event validation criteria, creating the calendar index note.

16. The computing device of claim 11, wherein the one or more programs include instructions for:
receiving, from a second remote device, a second content item, the second content item including at least one content item of one or more documents, photos, scanned images, audio clips, video clips, typed notes, and/or handwritten notes;
in response to receiving the second content item;
determining a second set of one or more content items attributes associated with the second content item;
determining a second distance metric indicating a distance between the second set of one or more content attributes associated with the second content item and the set of one or more event attributes for the event; and in accordance with a determination that the determined second distance metric meets criteria for linking the second content item and the event, storing, in the calendar index note associated with the event, a third link to the second content item; and in response to user selection of the third link in the calendar index note, providing access to the second content item, thereby facilitating sharing among the users of the online calendar application the cluster of event materials including the second content item.

17. The computing device of claim 11, wherein the set of one or more event attributes includes at least one of event time information, event location information, event agenda information, one or more attending participants, one or more action items associated with the event or one or more absent event participants.

18. The computing device of claim 17, wherein for each first content item, the set of one or more content attributes includes at least one of a time at which the first content item was posted, a location that corresponds to the first content item, a context that corresponds to the first content item, information about an action item in the content item, and information corresponding to a user that posted the first content item.

19. The computing device of claim 11, wherein:
the plurality of first content items include at least one digital image of handwritten notes provided on one or more pages, wherein at least one page of the one or more pages includes a first area designated for business notes and a second area designated for personal notes.

20. A non-transitory computer-readable storage medium, storing one or more programs for execution by one or more processors, the one or more programs including instructions for:
while executing an online calendar application:
creating a starting calendar note represented by a calendar icon displayed on a first area of a user interface of the online calendar application, the starting calendar note including event information of an event;
identifying one or more first remote devices associated with participants of the event based on the event information;
receiving, during or after the event and from the one or more first remote devices used by the participants of the event, a plurality of first content items that are associated with the event and provided by the participants of the event, each first content item including one of: a document, a photo, a scanned image, an audio clip, a video clip, a typed note, and a handwritten note, the plurality of first content items having two or more electronic formats distinct from the online calendar application; and
in response to receiving each of the plurality of first content items from a respective remote device, dynamically:
determining a first set of one or more content attributes associated with the first content item;
determining a set of one or more event attributes for the event; and
determining a first distance metric indicating a distance between the first set of one or more content attributes associated with the first content item and the set of one or more event attributes for the event; and in accordance with a determination that a determined distance metric meets criteria for linking the first content item and the event:
compiling a cluster of event materials for the event, including adding the first content item to the cluster of event materials;
recognizing business content in a first portion of the first content item and personal content in a second portion of the first content item;
enabling display of a calendar index note associated with the event in a second area of the user interface of the online calendar application;
adding, in the calendar index note associated with the event, at least a first link to the first content item including the business content and the personal content
in response to receiving, from the respective remote device, a selection of the first link in the calendar index note displayed on the second area of the user interface, providing access to the first content item including the personal content in the cluster of event materials to the respective remote device; and
in response to receiving, from a distinct remote device, a user selection of the first link in the calendar index note displayed on the second area of the user interface, providing access to the business content of the corresponding first content item, thereby facilitating sharing among users of the online calendar application the cluster of event materials including the plurality of first content items that are associated with the event by the participants of the event.

21. The non-transitory computer-readable storage medium of claim 20, wherein the one or more programs include instructions for:
for each first content item:
generating a content note for storage in a shared content collection; and
in response to receiving the first content items, storing at least a subset of the first content items in the content note in the shared content collection, wherein the first link is a link in the calendar index note for accessing the content note, and the content note includes a second link for accessing the calendar index note.

22. The non-transitory computer-readable storage medium of claim 21, wherein the one or more programs include instructions for adding the content note to the shared content collection accessible by the participants of the event and providing access to the content note to the participants of the event.

23. The non-transitory computer-readable storage medium of claim 21, wherein the calendar index note includes an indication of at least one attribute of the set of one or more event attributes.

24. The non-transitory computer-readable storage medium of claim 20, wherein the one or more programs include instructions for, at a time that corresponds to the event:
obtaining location information for one or more participants of the event from a subset of respective first remote devices of the one or more participants;
comparing the location information for the one or more participants with a location of the event; and in response to determining that the location information for the one or more participants satisfies event validation criteria, creating the calendar index note.

25. The non-transitory computer-readable storage medium of claim 20, wherein the event attributes include at least one of event time information, event location information, event agenda information, one or more attending participants, one or more action items associated with the event and one or more absent event participants.

26. The non-transitory computer-readable storage medium of claim 25, wherein for each first content item, the set of one or more content attributes includes at least one of a time at which the first content item was posted, a location that corresponds to the first content item, a context that corresponds to the first content item, information about an action item in the content item, or information corresponding to a user that posted the first content item.

27. The non-transitory computer-readable storage medium of claim 18, wherein:
 the plurality of first content items include at least one digital image of handwritten notes provided on one or more pages, wherein at least one page of the one or more pages includes a first area designated for business notes and a second area designated for personal notes.

\* \* \* \* \*